United States Patent [19]
Wegner

[11] Patent Number: 4,865,511
[45] Date of Patent: Sep. 12, 1989

[54] INSIDE LOADER FOR ROAD TRAFFIC, DESIGNED AS A SEMI-TRAILER FOR SEMI-TRACTOR, ESPECIALLY FOR TRANSPORTING PLATE GLASS

[75] Inventor: Alfons Wegner, Olfen, Fed. Rep. of Germany

[73] Assignee: Fahrzeugbau Langendorf GmbH & Co. KG, Fed. Rep. of Germany

[21] Appl. No.: 176,359

[22] Filed: Mar. 31, 1988

Related U.S. Application Data

[62] Division of Ser. No. 745,616, Jun. 17, 1985, Pat. No. 4,753,566.

[51] Int. Cl.[4] .............................................. B60P 1/02
[52] U.S. Cl. .................................... 414/498; 211/189; 296/3
[58] Field of Search ............... 414/459, 460, 476, 483, 414/484, 495, 498, 474, 475, 481, 482, 485, 496, 487, 458, 461; 280/414.1, 43.11, 43.23, 43.17, 43.18, 693, 6 R, 6 H, 711; 296/3, 27, 183, 203-205, 50-62; 211/50, 51, 60.1, 71, 85, 130, 149, 201, 206, 189, 195

[56] References Cited

U.S. PATENT DOCUMENTS

| | | | |
|---|---|---|---|
| 3,506,136 | 4/1970 | Burda | 211/189 |
| 3,848,917 | 11/1974 | O'Neal | 296/3 |
| 4,195,738 | 4/1980 | O'Neal | 296/3 X |
| 4,304,336 | 12/1981 | Mays | 296/3 X |
| 4,619,578 | 10/1986 | Routledge | 414/476 X |

FOREIGN PATENT DOCUMENTS

| | | | |
|---|---|---|---|
| 866173 | 12/1952 | Fed. Rep. of Germany | 296/3 |
| 1289438 | 2/1969 | Fed. Rep. of Germany | 296/3 |
| 7311859 | 3/1975 | Netherlands | 211/201 |
| 1041337 | 9/1983 | U.S.S.R. | 414/495 |

*Primary Examiner*—Frank E. Werner
*Attorney, Agent, or Firm*—Andrus, Sceales, Starke & Sawall

[57] ABSTRACT

The invention concerns an inside loader, designed as a trailer for a semi-tractor, for road traffic, and for loading, transporting and unloading transportation racks, preferably for plate glass. The loader includes an undercarriage having parallel longitudinal members, on the outside of each of which are located the axles of one side of the trailer. The axles are individually mounted on axle rocker arms supported by air shocks which, in their filled condition, serve as axle shocks, and in their empty condition are used to load or unload a transportation racks. Preferably, the invention's inside loader is equipped at the back of the undercarriage with a hinged gate which, when closed, connects the longitudinal members of the undercarriage with one another.

1 Claim, 7 Drawing Sheets

INSIDE LOADER FOR ROAD TRAFFIC, DESIGNED AS A SEMI-TRAILER FOR SEMI-TRACTOR, ESPECIALLY FOR TRANSPORTING PLATE GLASS

This application is a divisional application of application Ser. No. 745,616, filed June 17, 1985, now U.S. Pat. No. 4,753,566, issued June 28, 1988.

The on-the-road moving of transportation racks, which in their loaded state have considerable weight, for instance over 20 tons, and large dimensions, applies to different types of goods. Generally, the transportation racks consist of a basic frame and a rack with inward-sloping sides to support the freight, which rack is placed on the frame. In general, several plate-like elements are transported on each side of the transportation rack.

The present invention concerns plate-type freight which is particularly sensitive to breaking and cracking. This includes above all plate glass, which is manufactured, for example, in floatglass plants in large-sized plates, which are then loaded on both sides of a transportation rack. These differ, for example, from large concrete slabs, which are employed in the so-called slab-method in building construction, and which have a low sensitivity to breaking and cracking. This basically affects the design of the trailer, because the suspension for the latter, more robust materials, can be considerably harder and is therefore always hydraulic. The invention's inside loaders, on the other hand, are equipped with gas shocks as described earlier, which are mainly designed as air shocks.

Furthermore, the invention's inside loaders provide for complete covering of the freight during road hauling by means of a tarpaulin, since especially plate glass has to be protected against contamination to which large concrete slabs, for example, are immune.

The invention is further explained in the following in an example of transporting plate glass which utilizes air suspension of the vehicle in order to avoid transport damage through breaking of the glass. The inside loader of the invention receives, as a rule, one of the above described transportation racks loaded with several glass panes. For this purpose its height is dimensioned in such a way that, with the loaded transportation rack and tarpaulin cover, the maximum permissible transport height (f.i. 4 m) is not exceeded. This limits the height of the glass panes which can be accomodated on the transportation rack. The length of the transportation rack can be accomodated without difficulty between the longitudinal members of the undercarriage. These are held together in the front by means of a crossbeam and in the back by the above-described gate, which is closed after the transportation rack has been loaded onto the trailer. The trailer has the traditional offset, and below this a saddle-coupling for commercial semi-trucks, i.e. generally the kingpin which engages the saddle of the coupling located on the truck.

The gas pressure springs in the invention's inside loader should be preferably designed as pneumatic shock absorbers. On the road, these shock absorbers cushion the rocker arms on which the axle of the rear wheels is mounted; however, they serve simultaneously as a lifting device when the transportation rack is loaded and unloaded. In order to lower the undercarriage, the air can be let out of the springs. Generally, the vehicle of the invention carries sufficient air in pressure tanks, in order to be able to refill the shock absorbers for raising the trailer up again; that way, the truck's motor does not have to be used for generating compressed air in an air compressor for the purpose of loading and unloading. As a rule, the pressure tanks are recharged en route by the vehicle's compressor.

The invention's inside loader thus permits the loading and unloading of a transportation rack exclusively with on-board means. If the invention's vehicle is moved during loading or unloading, there is sufficient play between the vehicle's supporting members and the longitudinal frame members of the transportation rack in order to join or separate the vehicle and the transportation rack without collision. On the other hand, by raising the axles above the rocker arms the vertical clearance of motion can be raised and the transportation rack can be adjusted to the ground clearance required on the road.

The described operation of the invention's inside loader results in a separation of the axles in the trailer, which is in each case common to one pair of wheels running on both sides of the undercarriage. This separation occurs in the center, so that the space between the longitudinal members of the undercarriage remains open. Thus, the wheels of a wheel pair running at the same height are located on aligned axle pairs, the axles of which are placed outside at the longitudinal members of the undercarriage. Generally at least two axle pairs of this type are required to support the considerable loads, but usually three axle pairs are sufficient, of which one forward axle pair constitutes the front axle of the undercarriage, while the remaining axle pairs run behind the front axle.

Such inside loaders are also known as glass transporters of the type described. The axle base is specified and generally very short, the reason being, among other things, that the track alignment of the trailer undercarriage does not become too large in the interest of sufficient turning mobility. In general, the rocker arm joints are located in front of the axles, which are supported at the assigned rocker arms. Such rocker arms are usually triangular flat plates, which are perforated in the middle to lessen their weight, and which have the axle or the shaft in the points of their base angles and the support for the gas shock absorber in the vertex. During no-load operation the resulting disadvantage has been that high tire wear observed on curved roads with the loaded vehicle hardly improves, the tire wear being caused by the track alignment of the trailer. It was further shown that the joints of the axle rocker arms are subject to fast wear. On account of the great stress, the bearing of the axle rocker arms must be strongly built; at the same time, however, the bearing shaft executes a large number of minor angle turns in both directions in the bearing housing while the vehicle is moving. This evidently results in the loss of the lubrication film on the supported portion of the joint shaft and thereby in the above-mentioned excessive wear.

In addition one notes on known inside loaders that, when the trailer is loaded, the longitudinal members of the undercarriage are twisted around their forward, bending-resistant connection with a cross beam of the undercarriage frame, which causes the axles to be swung upward from the horizontal and the wheels to be swung outward. This creates uncontrollable driving conditions and, in any case, increased tire wear. A tendency which is particularly dangerous is that the gate, closed for travel, can suddenly open and swing outward. In that case the longitudinal members of the undercarriage lose their rear connection, swing outward under the stress of the load, and the vehicle can possibly lose the loaded rack.

Finally, as far as known inside loaders are concerned, adapting them to the purpose of transporting the described carrying racks has proven to be disadvantageous. In fact, in practical use such inside loaders are frequently loaded far less than half of their traveling distance and are empty the rest of the trip. This could make transporting plate glass, among other things, with such inside loaders uneconomical, because the vehicles could also carry a load on their return trip to the glass factory if they were equipped to do so.

The object of the invention, therefore, is an inside loader which shows reduced tire wear when traveling empty, or when traveling while loaded only to a fraction of its maximum capacity, especially when driving around curves. In particular, in spite of the described disadvantageous space conditions especially at the trailing axle of the trailer chassis, these advantages are achieved by the invention without essential modifications in the design of the axles and their rocker arms or bearings.

Furthermore, it is the object of the invention to design an inside loader of the type described in such a way that sufficient lubrication of the pivot bearings of the axle rockers is assured in spite of the tendency for the lubricant to tear away from the lubricated surfaces under the given stress conditions.

In addition, it is the purpose of the invention to provide sufficient and safe bracing of the longitudinal members of the undercarriage by means of the described gate while the vehicle is moving.

A further object of the invention is an inside loader which can be used, not only for transporting the described transportation racks, but also on the return trip, on which it carries the empty transportation rack and is loaded with other types of cargo, especially piece goods, thus assuring economical use.

This and other objects of the invention, as well as their details, will be shown in the following description of an inside loader according to the invention, which is equipped for the transport of large panes of plate glass, by using the figures in the drawings. Shown are in FIG. 1 an inside loader according to the invention, as a sideview diagram, without the truck, FIG. 2 sideview of the left front axle of the trailer chassis, in direction of travel, FIG. 3 the right trailing axle of the trailer chassis as per FIG. 2, in direction of travel, FIG. 4 a section along the line IV—IV of FIG. 3, FIG. 5 a view broken at the top of the rear end of the inside loader according to the invention.

Figure 1:
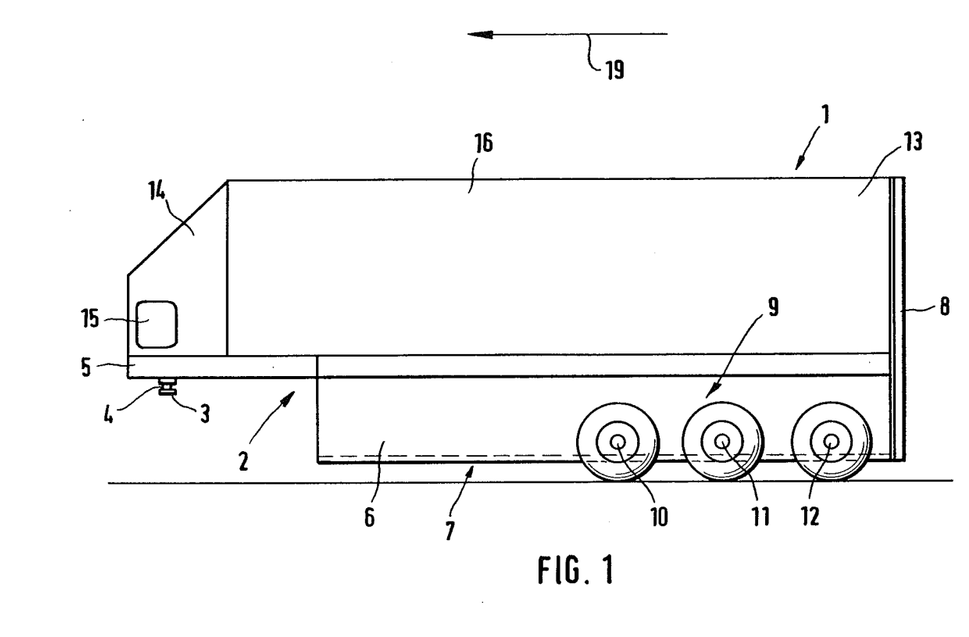

According to the drawing of FIG. 1 the trailer 1, shown without the truck, is designed as an interior loader. It has the traditional recessed front 2 with the king pin 3 protruding downward, which has a notch 4 for engaging with a saddle coupling (not shown), which is located on the truck. In the area of the recess 2, two parallel and relatively high longitudinal supports 6, 77 (fig.5) of the undercarriage are rigidly connected against angular deflection to one another by means of a cross beam 5. Thus, seen from above, i.e. in the top view, the trailer undercarriage 7 is U-shaped. At the rear the gate 8 is located, details of which will be explained later. During travel the gatge is used to connect the two parallel longitudinal supports of the undercarriage into a bending-resistant unit.

The trailer undercarriage, generally designated as 9, is supported on each side of the trailer, i.e. on each of the longitudinal undercarriage supports and thus designed in pairs. The example shows a three-axle undercarriage, i.e. one front axle pair 10, one trailing central axle pair 11 and one trailing axle pair 12.

A transportation rack can be placed in the interior space 13 formed along the length of the longitudinal supports of the trailer 1. On the saddle, i.e. at the upper recess equipped with the cross-beam 5, is a superstructure 14, which has windows 15 on both sides, so that the contents of the vehicle can be observed. The loading space 13, furthermore, is covered by a one-piece tarpaulin.

Figure 2:
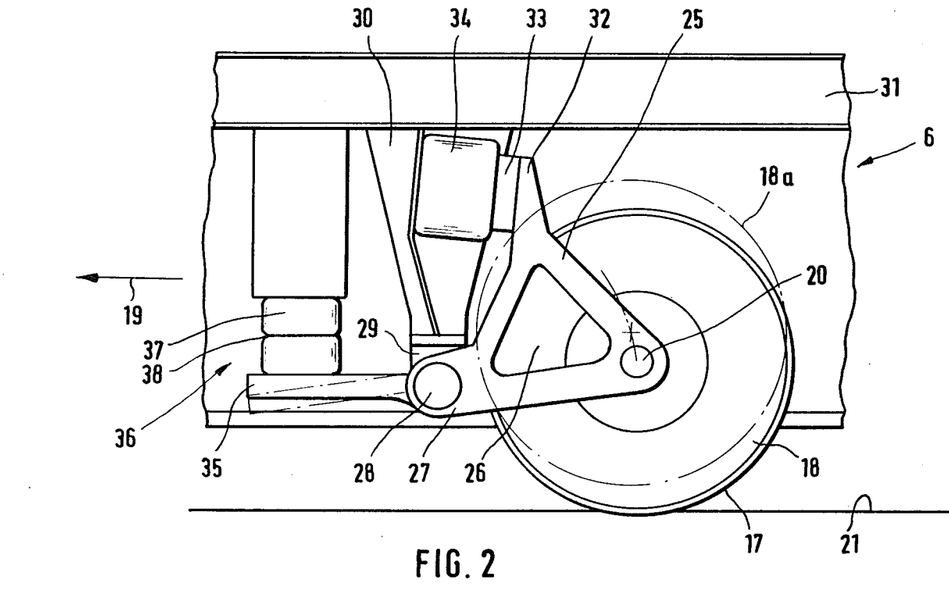
Figure 3:
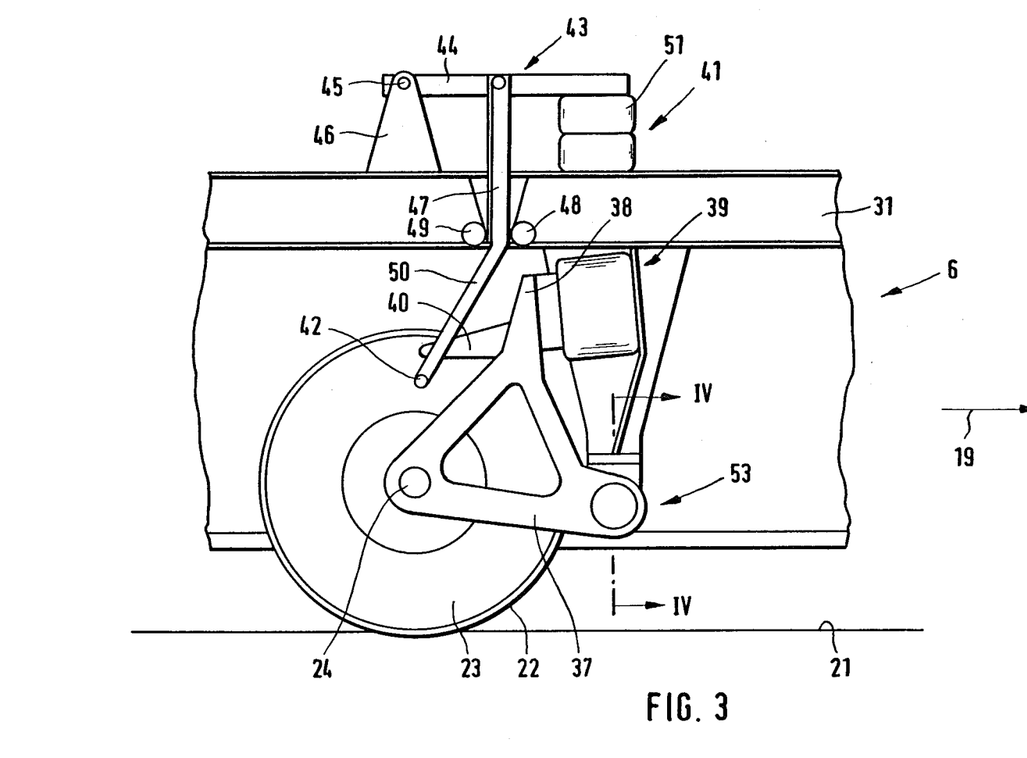

As seen in fig's. 2 and 3, the front axle pair 10 and the trailing axle pair 11 are each designed as so-called lifting axles. This denotes the possibility of raising the surface of the front wheel 18, which belongs to the front axle 20 shown in the direction of travel in FIG. 1, from the road surface 21, as well as raising the surface 22 of the opposite wheel belonging to the same pair, as well as raising the surface 22 of the trailing wheel 23, which is supported on axle 24, just as the opposite wheel, which belongs to the axle pair 11. For wheel 18 the raised position is shown as a dotted line at 18a in FIG. 2.

It must be remembered that the axles 10 to 12 at each side, or at each longitudinal vehicle support 6, are constructed identically, so that it suffices to explain in detail one each side of the vehicle by means of the figures.

Accordingly, the front axle 20 is equipped with a generally triangular axle rocker 25. This has a triangular cutout 26, the sides of which are parallel with the outside edges of the rocker, which reduces its weight. In the extension of the front base angle the axle rocker has a projection 27, which is bored for receiving a joint shaft 28. The axle rocker 25 is connected to the joint shaft 28 in a non-rotatable manner. The joint shaft is in a bearing 29, which is connected with the longitudinal support 6 by means of an abutment 30. This longitudinal support has a flange 31 protruding outward, so that the tires and the wheel bearings are protected under the flange 31.

The axle 20 of the wheel is located in the opposite base angle of the triangular axle rocker 25; in extension of the angle vertex there is a further projection 32 of the rocker 25. This is supported on a plate 33 of a flexible bellows 34, which is filled with compressed air and constitutes the cylindrical portion of a gas pressure spring. In the operating position of the axle 20, or its wheel 18 (see FIG. 1, solid lines), the axle rocker 25, under the effect of irregularities in the road surface 21, can turn anti-clockwise with the shaft joint 28 in the bearing 29; as it does, it compresses the bellows 34 against the latter's interior pressure.

The axle rocker (FIG. 2) is equipped with a crank arm which, according to the construction example shown, is made in one piece with the axle rocker. A crank drive, given the general designation 36, acts on the cantilevered front end of the sliding block 35. The crank drive, in accordance with the example shown, consists of a gas pressure spring with extended stroke.

For this reason the bellows 37 is strengthened with an in-laid bending-resistant ring 38.

If the axle 20 is to be lifted, the gas pressure spring 36 is filled with compressed air, the sliding block 35 moves into the position shown by dotted line and compresses the gas pressure spring 34; this moves the surface 17 of the wheel 18 into position 18a.

The above description of the design of the axle 20 of the front axle pair 10 is not applicable to the trailing axle of the middle axle pair 11, because there is insufficient space behind the wheel 18 for mounting the sliding block 35 and the crank drive 36.

To solve this problem, the axle rocker 37, which otherwise is of analogous design with the axle rocker 25, and which rests with its extension 38 on the gas pressure spring 39, is equipped with the sliding block 40, pointing to the rear. When the axle is raised, the sliding block 40 is lifted via a crank drive 41 over a bolt 42. This is achieved by means of a lever bar 43. A rocker 44 is attached to the frame; this rocker 44 pivots in a bearing 45 of a bearing block 46, which, in turn, is attached to the flange 31 of the longitudinal support 6. At about the center of rocker 44 an offset coupling 47 is hinged; the straight and vertical arm of this coupling 47 is held in front and in back by one each roller guide 48, 49. The free angular arm 50 of the coupling acts via the above-mentioned bolt 42 on the sliding block 40 as soon as, due to the extension of the gas pressure spring 51, which constitutes the crank drive 41, the lever 44 swings upward and lifts the crank 40 over the bolt 42. Since the lever bar 43, as well as the crank drive 41, is located above the axle 24, the existing space is sufficient for mounting the drives and gears necessary for a trailing lift axle.

When the wheels of the front axle 10 and the wheels of axle 11 trailing it have been raised as described above in detail, the trailer 1 rides only on the rear axle 12. This means that it has good maneuverability and will perform well on curves. This driving condition is intended for the empty or partially empty inside loader. It is possible, of course, to act only upon the sliding blocks 35 of the front axle pair 10, which extend forward, and to lift this axle pair, while the trailing axle pairs 11 and 12 remain on the road surface. On the other hand, it is also possible to activate by means of the crank drive 41 the sliding blocks 40 of the axle pair 11, which extend rearward, and thus to lift the axles 24, so that the axle pairs 10 and 12 retain ground contact with their wheels. Preferably all rocker joints of the invention should be constructed analogously. Such a rocker joint is generally designated as 53 and shown in FIG. 3. Its design features can be seen in FIG. 4. Accordingly, the faced front end 54 of the joint bolt 28 (described in connection with FIG. 2) is inserted in the recess 55 of the respective rocker 37. The free end of the joint shaft is welded in front of and behind the rocker 37 by means of fillet joints 56 and 57. The inner fillet joint is located on an outer flange 58 of the joint shaft 28, which remains outside the bearing 29. This bearing consists of a mounting plate 59, which is attached to the longitudinal support 6 of the vehicle by means of several borings and which holds a cylindrical bearing box by means of ribs (shown at 60). This bearing box has a hollow cylinder 62 in front, which is welded to a hollow cylinder 64 at the rear by means of a fillet joint 62a. the front hollow cylinder 62 is used to attach an outer angle joint bearing 63 and its outer lubricant seal 63a, which will be described later. The inner end of the inner hollow cylinder 64 is used to receive an inner angle joint bearing 65, which otherwise is the same as bearing 63, and its inner lubricant seal. The components of the lubricant seal 63a and 65a are held together by a nut via the flange or the inner face of nut 67. Each of the two angle joint bearings 63 and 65 has an outer bearing box 68 with a slanted, concave bearing surface 69, as well as an inner bearing box 70 with a slanted, convex bearing surface 71. The bearing surfaces are equipped with cross grooves (not shown), on which oil will collect. the oil reaches the bearing surfaces directly from an oil reservoir 72, which is located between the bearing 61 and the joint shaft inside the inner cylinder 64.

Figure 4:
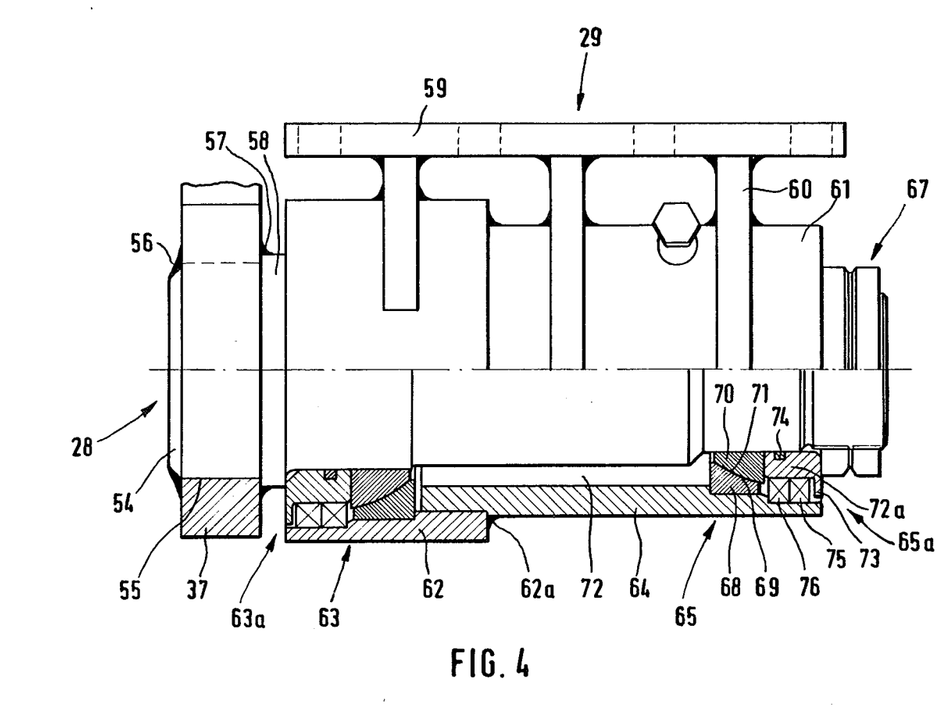

The lubrication seal consists in both cases of a shrouding ring 72a, on the flange 73 of which the nut, or the joint shaft, is supported, and which has an interior O-ring seal 74, and of two axially consecutive radial seals 75 and 76 (retaining rings or oil seals).

As the wheels, for example of the trailing axle pair 11, roll over the rough road surface 21 and the gas pressure springs 39 give in, the joint shaft 28 executes a large number of small angular movements in both directions in the bearing 61. Thhe lubricant from the lubricant reservoir 72 is retained by means of the above-described transverse grooves on the bearing surfaces 69 and 70 of the angle joint bearings 63 and 65, so that the bearing surfaces do become dry. This assures wear resistance on longer trips.

Figure 5:
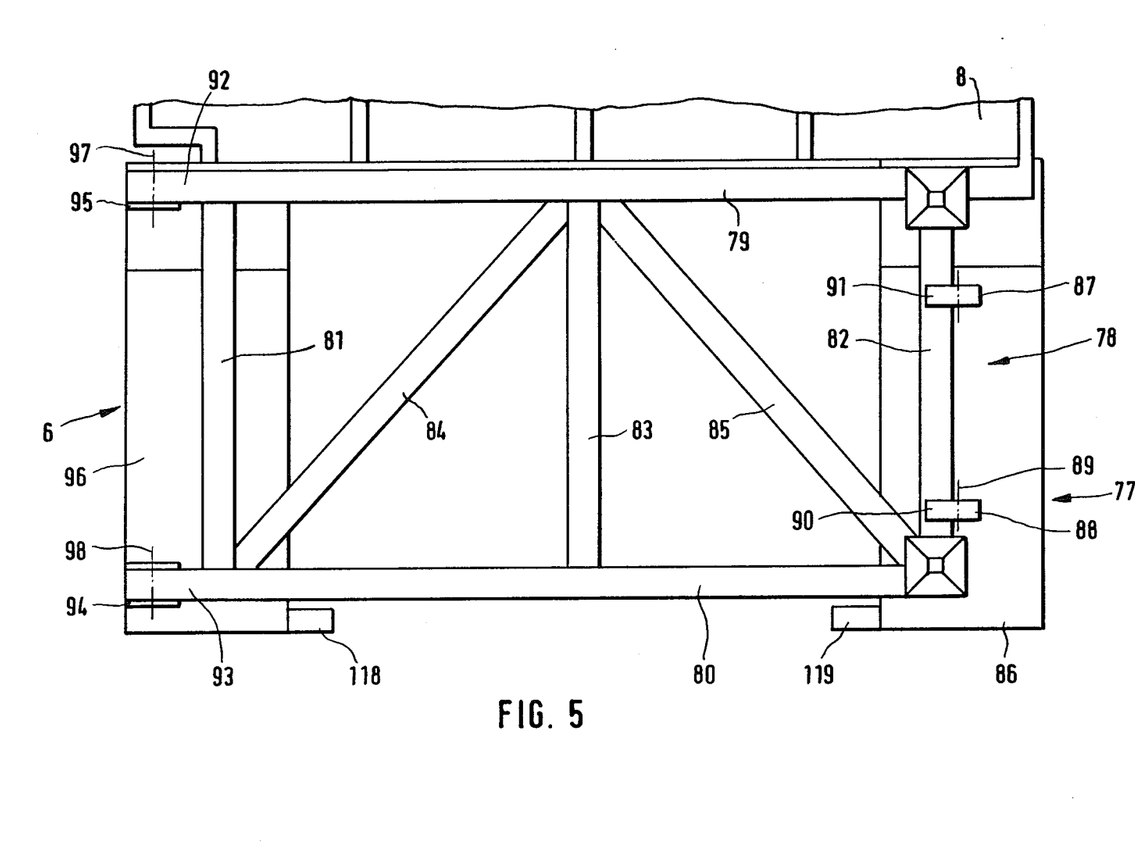

The rear view of the trailer 1 as per FIG. 5 shows the two parallel longitudinal supports 6 and 77. Since the above-described U-shaped chassis frame 7 has a length of ca. 8 to 10 m, the longitudinal supports of the frame (6 and 77) have poor torsional strength, especially under the effect of a load. In order to avoid torsion of the longitudinal frame members at the rear, the gate 8 is connected in a bending-resistant fashion with a lower transom (78) (see FIG. 5). This transom is a lattice girder, consisting of two outer frame crossbars 79, 80, two outer parallel frame members 81, 82, which are rigidly connected at angles to the crossbars 70 and 80, one central frame member 83, which is likewise parallel, and two diagonal bars 84, 85, which are rigidly connected at angles to the frame members. At the rear 86 of the longitudinal frame supports 77 are the stationary wings of two hinges 87, 88, which are located one above the others. the hinge axes are indicated with dotted lines, as in 89. The moving wings 90, 91 of the hinges 87, 88 are located on one of the parallel frame members, i.e. frame member 82. The crossbars 79 and 80 of the transom 78 are extended past the parallel frame member 81, as shown with 92 and 93. They can be pivoted into U-shaped bearing boxes 94, 95, which are attached at the rear 96 of the other longitudinal frame support 6. In the bearing boxes the parts 92, 93 are connected by means of bolts shown only by their axes 97, 98.

The transom 78 consequently constitutes, when closed, a angularly rigid connection of the longitudinal frame members 6 and 77, which excludes a connection of the longitudinal frame members.

Figure 6:
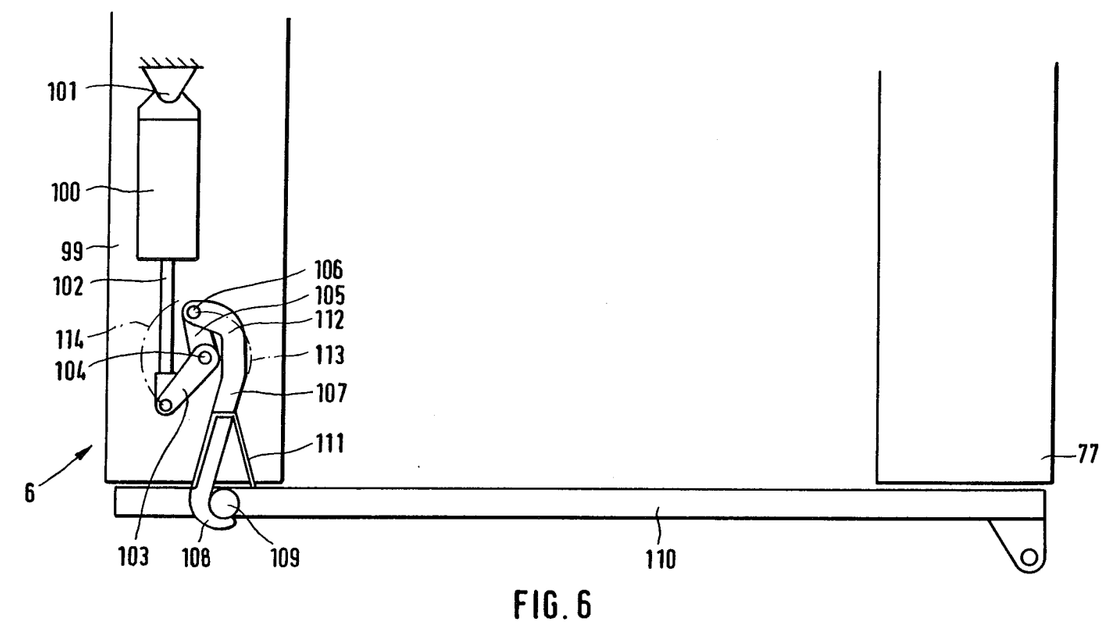
FIG. 6 the subject of FIG. 5, in broken plan view.

According to the representation in FIG. 6, a working cylinder 100 is hinged to a bracket 101 for horizontal pivoting on the top 99 of the longitudinal frame member 6. The piston rod 102 of the working cylinder 100 acts upon a toggle lever 100, which is hinged to the longitudinal frame support 6 at point 104. The free arm 105 of the toggle lever 103 has a connecting joint 106 for an offset latching bar 107, which has a hook-shaped end 108, which end acts jointly with a round bolt 109, which is attached to a gatge crossbar 110. On the inside the crossbar 110 has a latch guide 111.

When the gate 8 is closed, the piston rod 102 has moved into the working cylinder 100. As a result, the offset end 112 of latching bar 107 has been pivoted clockwise (see dotted line 113) and the hook-shaped end 108 has released the bolt 109. As soon as the gate is closed, the piston rod 102 moves out of the working cylinder 100. This causes the offset end 112 of the latch 107 to pivot anticlockwise over the dead center of the toggle lever 100 to the outside (see dotted line 114). In this case the opposite pivot motion of the latch 107 is blocked and the gate is securely locked. The working cylinder is a double-acting compressed air cylinder. Even if loss of air removes the pressure from the cylinder, the above-described latch 107 assures the continued locking of the gate 8.

Figure 7:
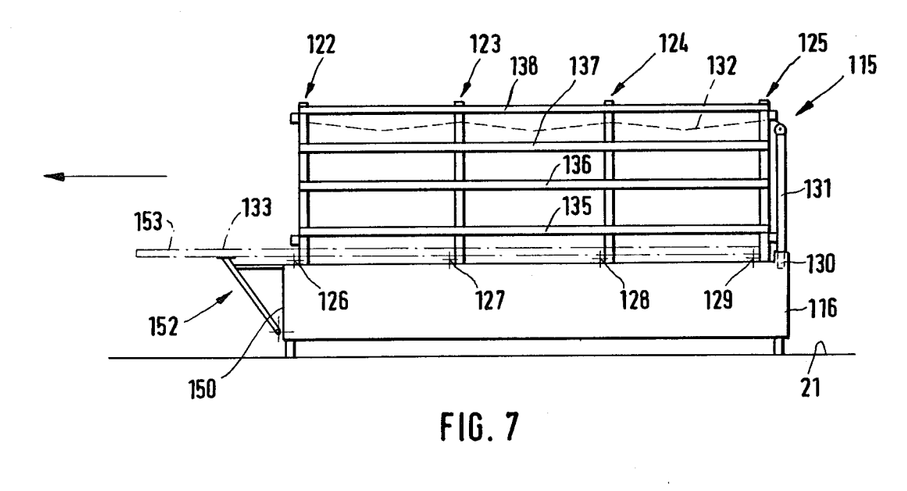
FIG. 7 a transportation rack according to the invention.
Figure 8:
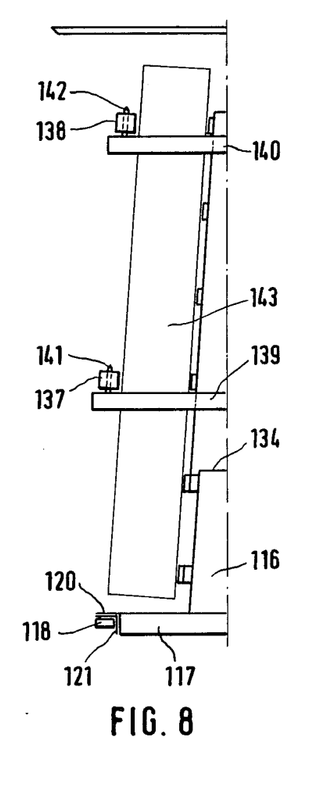
FIG. 8 one side of the transportation rack shown in FIG. 7.

The described inside loader can be loaded with a rack which in FIG. 7 is generally designated as 115. As the drawing in FIG. 8 shows, such a rack has a hollow basic support or frame 116 with arms 117 protruding outward. FIG. 8 shows at 118 one of the two longitudinal rails depicted in FIG. 5 in front view at 118 and 119. These rails are attached to the inside of their respective longitudinal frame support 6 or 77. the arms 117 have upper extensions 120, which can rest on the top of respective rail 118, while the inner sides of the rails abut against the inner faces of the arms 117, as shown with 121.

Along the considerable length of the transport rack, essentially triangular, but congruent, supports 122 to 125 are placed at a distance from each other. Each of these supports is hinged to the base 116 by means of horizontal hinges 126 to 129. The hollow-girder 116 forming the base receives the insertable end 130 of a winch 131, the cable of which (132) is connected with all supports 122 to 125. If the winch cable is slackened, the supports 122 to 125 fold into the position 133 shown by a dotted line in FIG. 7. In this position the supports are aligned with the top 134 of the transport rack, i.e. the hollow frame or support 116. When the transport rack is loaded, its top 134 is aligned with the top of the longitudinal frame supports 6 or 77, so that with the supports 122 to 125 folded down a continuous loading surface results in the interior of the flat-bed trailer 1.

When the supports 122 to 125 are raised, they are secured by several girders 135 to 138, which run in the longitudinal direction of the transport rack 115. Before the supports are folded down, these girders must be taken off. For this purpose, pointed bolts 141, 142 are provided for the two upper girders 137, 138 on arms 139, 140, which arms run parallel to lower arm 117. These bolts engage corresponding notches in the girders.

As can be otherwise seen in the drawing in FIG. 8, in the loaded condition packets of panes 143 are placed and secured on each side of the transport rack.

In order to load the vehicle, the gate is first opened (8). The transport rack 115 stands on the surface 21 on which the vehicle is moving. As soon as the vehicle stands in front of the transport rack, the compressed air is let out of the gas pressure springs 34 or 39 of all axles of the trailer chassis. This causes the axle rockers to pivot forward and the longitudinal supports 6 or 7 of the vehicle are lowered to just above the surface 21, onto which the vehicle continues to move. When the trailer chassis 9 is in this condition it retains emergency moving capability, which makes it possible to further maneuver the vehicle.

By backing up the vehicle is maneuvered in such a way that, as it continues to back up, the inner longitudinal rails 118, 119 are guided by, and move along, the surfaces 121 of the arms 117 below the arm extensions. As soon as the front of the transport rack has reached the offset 2, the vehicle is stopped. By introducing compressed air into the air pressure springs, the axle rockers are pivoted back into their operating position. This again raises the trailer chassis. It finally reaches its operating height above the surface 21, while the transport rack 115 has been lifted from the ground and rests on the top of the rails 118 or 119, respectively. The gate 8 is now closed and locked as described. Since the cross-latch 78 was closed before raising the transport rack 118, it was impossible for the longitudinal supports 6 or 7, respectively, to twist and push inward with their upper portions under the effect of the load.

If the transport rack 115 is to be left at the destination, the process described above is repeated in reverse order. When the gate 8 is opened, the vehicle can leave the area of the transport rack 115, which has been placed on the surface 21. If the transport rack 115 has been unloaded, but reloaded, as described, and if its girders 135 to 138 have been removed, the supports 122 to 125 can be folded into position 133; this, with the help of a bracket 152 attached to the front 150 of the transport rack 115, creates a continuous loading surface 153, which is laterally aligned with the longitudinal supports 6 or 77, respectively, of the vehicle. The transport rack can be loaded in the described condition; in any case, the vehicle acquires a plank bed construction over its entire width, which is covered with the tarpaulin 16. In this condition the vehicles can be especially loaded with piece goods.

I claim:

1. A transportation rack for goods including plate glass, said transportation rack being suitable for use with an interior loader formed as an over-the-road trailer for a tractor, said loader having a chassis for receiving said transportation rack, said chassis having a frame including spaced parallel longitudinal frame members, said chassis having adjustable height wheel means mounted thereon for permitting said chassis to be raised and lowered, said transportation rack comprising:

an elongated base removably insertable between said spaced frame members when said chassis is lowered, said base having means engaging said frame members for supporting said transportation rack on said frame members;

a plurality of generally triangularly shaped, unitary supports spacedly arranged in tandem along said base, said supports being hinged on said base and pivotally movable between a vertical position and a folded-down position about axes normal to the direction of elongation of said base, said supports forming a loading surface when in the folded-down position;

a cable winch mountable on said base and having a cable couplable to said supports for raising and lowering said supports; and a hinged bracket mounted on said base to extend beyond said base, one of said supports extending beyond said base when in the folded-down position so as to be supported by said hinged bracket.

* * * * *